(12) United States Patent
Kemmer (10) Patent No.: US 12,460,653 B2
(45) Date of Patent: Nov. 4, 2025

(54) METHOD FOR OPERATING A MULTI-STAGE AIR COMPRESSION SYSTEM, MULTI-STAGE AIR COMPRESSION SYSTEM, AND FUEL CELL SYSTEM

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/855,473

(22) PCT Filed: Mar. 6, 2023

(86) PCT No.: PCT/EP2023/055599
§ 371 (c)(1),
(2) Date: Oct. 9, 2024

(87) PCT Pub. No.: WO2023/208459
PCT Pub. Date: Nov. 2, 2023

(65) Prior Publication Data
US 2025/0237220 A1    Jul. 24, 2025

(30) Foreign Application Priority Data
Apr. 28, 2022   (DE) .................. 10 2022 204 160.7

(51) Int. Cl.
*F04D 25/06*     (2006.01)
*F04D 27/02*     (2006.01)
*H01M 8/04111*   (2016.01)

(52) U.S. Cl.
CPC ......... *F04D 25/06* (2013.01); *F04D 27/0215* (2013.01); *F04D 27/0253* (2013.01); *H01M 8/04111* (2013.01)

(58) Field of Classification Search
CPC .... F02C 6/12; F02C 9/18; F04D 17/12; F04D 25/024; F04D 25/06; F04D 25/16;
(Continued)

(56) References Cited

U.S. PATENT DOCUMENTS 10,801,427 B2 * 10/2020 Han ....................... F02M 26/15
11,473,583 B2 * 10/2022 Kemmer ............ H01M 8/04111
(Continued)

FOREIGN PATENT DOCUMENTS

| DE | 102006007347 A1 | 8/2007 |
|----|----|----|
| DE | 102019219997 A1 | 6/2021 |
| EP | 1116885 B1 | 1/2007 |

OTHER PUBLICATIONS

Translation of International Search Report for Application No. PCT/EP2023/055599 dated May 24, 2023 (2 pages).

*Primary Examiner* — Jesse S Bogue
(74) *Attorney, Agent, or Firm* — Michael Best & Friedrich LLP (57) ABSTRACT

The invention relates to a method for operating a multi-stage air compression system (1) comprising an electrically driven first compressor (1.1) and a second compressor (1.2) driven by a turbine (2), wherein the compressors (1.1, 1.2) are arranged in a supply air path (3) and the turbine (2) is arranged in an exhaust air path (4) of an air system for supplying air to a fuel cell stack (5). According to the invention, when the air compression system (1) is started, the air compressed by means of the first compressor (1.1) is supplied to the fuel cell stack (5) via a bypass (6) to bypass the second compressor (1.2) and the second compressor (1.2) is connected to the surrounding environment on both the inlet and outlet sides via at least one valve (7, 8) and/or a throttle valve (9).

(Continued)

The invention further relates to a multi-stage air compression system (1) as well as a fuel cell system having a multi-stage air compression system (1).

19 Claims, 13 Drawing Sheets

(58) Field of Classification Search
CPC ............ F04D 27/0207; F04D 27/0215; F04D 27/0253; F05D 2220/40; F05D 2260/85; F05D 2260/90; F05D 2270/101; H01M 8/04111; Y02E 60/50
See application file for complete search history.

(56) References Cited

U.S. PATENT DOCUMENTS

| | | | |
|---|---|---|---|
| 2004/0151964 A1* | 8/2004 | Finger | H01M 8/04111 429/513 |
| 2010/0203365 A1* | 8/2010 | Konrad | H01M 8/04097 429/408 |
| 2013/0309060 A1 | 11/2013 | Johnsen | |
| 2023/0197988 A1* | 6/2023 | Harr | H01M 8/04664 429/429 |
| 2024/0063405 A1* | 2/2024 | Harr | H01M 8/04111 |

* cited by examiner

METHOD FOR OPERATING A MULTI-STAGE AIR COMPRESSION SYSTEM, MULTI-STAGE AIR COMPRESSION SYSTEM, AND FUEL CELL SYSTEM

BACKGROUND

The invention relates to a method for operating a multi-stage air compression system, as well as a multi-stage air compression system operable according to the method. Further, a fuel cell system with a multi-stage air compression system according to the present invention is proposed.

Hydrogen-based fuel cell systems are considered to be the mobility concept of the future, because they only emit water as an exhaust gas and enable fast fueling times. An oxidizing agent is needed in addition to hydrogen, for example oxygen. As a rule, air taken from the surrounding environment serves as the oxygen source. The oxygen is converted into electrical energy, heat and water in the fuel cells together with the hydrogen in an electrochemical reaction.

Because the electrochemical reaction in the fuel cells requires some mass air flow as well as some level of pressure, the air supplied to the fuel cells is pre-compressed. Air compression systems, which can be single- or multi-stage as well as single- or multi-flow, are used to do so. Two-stage air compression systems are often used in mobile applications where high efficiency and high reliability are required, and especially in commercial vehicles. These include a first stage with an electrically driven compressor and a second stage with a turbine driven compressor. The second compression stage is also referred to as a turbomachine.

In order to start the turbomachine when the multi-stage air compression system is started, the pressure at the inlet of the turbine must be higher than the pressure at the inlet of the compressor of the turbomachine. However, since the pressure is built up when the system is started solely via the electrically driven first compression stage, in principle the pressure at the inlet of the turbine is less than the pressure at the inlet of the compressor of the turbomachine, so that it does not start up.

SUMMARY

The present invention relates to the task of eliminating or at least alleviating the startup problems when starting a multi-stage air compression system.

The method and the air compression system according to the disclosure are proposed in order to achieve said object. Further specified is a fuel cell system having an air compression system according to the invention.

A method of operating a multi-stage air compression system comprising an electrically driven first compressor and a second compressor driven by a turbine, wherein the compressors are arranged in a supply air path and the turbine is disposed in an exhaust air path of an air system for supplying air to a fuel cell stack. According to the invention, when the air compression system is started, the air compressed by means of the first compressor is supplied to the fuel cell stack via a bypass to bypass the second compressor and the second compressor is connected to the surrounding environment on both the inlet and outlet sides via at least one valve and/or a throttle valve.

At startup, the air compressed with the help of the electrically driven first compressor is thus passed by the second compressor. At the same time, the pressure applied to the second compressor is lowered to ambient pressure via the connection of the second compressor to the surrounding environment. These measures are suitable to build up pressure at the inlet of the turbine that is above the ambient pressure and thus above the pressure at the inlet of the second compressor. The second compression stage can thus be easily started solely with the aid of the first compression stage.

The second compressor may be connected to the surrounding environment in a variety of ways. For example, a valve, such as a 4-way valve or a 3-way valve, may respectively be integrated in the supply air path upstream and downstream of the second compressor. Designing the valves as a 4-way valve has the advantage that the bypass can be connected to the supply air path via the same valves. As an alternative to using two valves, a valve can be integrated upstream of the second compressor, and a throttle valve can be integrated into the supply air path downstream of the second compressor. This makes it possible to implement the proposed method in a very simple and cost-effective way.

In the further development of the invention, it is proposed that, after the air compression system is started, the connection of the second compressor to the surrounding environment is closed with the aid of the at least one valve while the bypass is kept open. Due to the pressure build-up caused with the aid of the turbine, the air then flows backward via the bypass. In this way, the ramp-up of the turbine may be dampened, for example to prevent the second compression stage from over-revving.

To subsequently transition from the startup phase to normal operation, it is proposed that after the connection of the second compressor to the surrounding environment is closed, the bypass is closed. The air compressed with the help of the first compressor is then supplied to the fuel cell stack no longer via the bypass but via the second compressor. For the purpose of pressure regulation, the bypass can be opened temporarily even in normal operation, so that at least a partial flow of the compressed air is passed by the second compressor via the bypass.

Further, it is proposed that, in normal operation of the air compression system, the second compressor is at least temporarily connected to the surrounding environment via the at least one valve and/or the throttle valve to implement a pump protection function. In this way, undesirable pumping may be prevented, which occurs when a pumping limit predetermined by the respective engine characteristics of the compressor are exceeded, causing it to stall, and potentially even causing the flow to be reversed.

Alternatively, or in addition, the bypass may be opened in normal operation of the air compression system to bypass the second compressor to implement a pump protection function.

Furthermore, it is proposed that when the air compression system is stopped, the bypass is opened to bypass the second compressor. This measure can be used to decelerate the second compression stage more quickly, thereby reducing bearing wear. This is particularly advantageous because, as a rule, the bearings are designed as gas bearings because the air in a fuel cell system must be oil-free. If the speed is below the so-called lift-off speed, which is the case during startup and stop, then there is no "lubricating" air film in the bearings, so they are subject to increased frictional load. This frictional load is reduced when stopping is shortened by the proposed measure.

Advantageously, the at least one valve or at least one additional valve via which the bypass is connected to the supply air path is actuated to open the bypass. As already mentioned, the at least one valve via which the second compressor can be connected to the surrounding environment can be embodied as 4-way valve, such that the bypass can be connected to the supply air path at the same time. Depending on the switch position of the 4-way valve, the air compressed with the help of the first compressor is then supplied to the second compressor and/or to the bypass. Further, the 4-way valve may be switched such that the bypass is opened and the second compressor is connected to the surrounding environment. In this case, only two 4-way valves are needed to perform the proposed method, a first valve integrated upstream and a second valve integrated downstream of the second compressor in the supply air path.

Alternatively, the bypass may be connected to the supply air path by means of at least one additional valve. This is then preferably embodied as a 3-way valve. Preferably, a 3-way valve is integrated upstream of the second compressor and another 3-way valve is integrated downstream of the second compressor in the supply air path, each further preferably integrated upstream and downstream of the valves for connecting the second compressor to the surrounding environment. These can then also be 3-way valves, so that a total of four 3-way valves are required, two of which are each arranged upstream and two downstream of the second compressor in the supply air path.

The connection of the second compressor to the surrounding environment may also be realized via a valve, for example a 3-way valve, and a throttle valve. In this case, the throttle valve is preferably upstream and the valve is integrated downstream of the second compressor in the supply air path. The bypass may then be connected to the supply air path via an additional valve, further preferably embodied as a 3-way valve, integrated in the supply air path, preferably upstream of the throttle valve. By way of a further throttle valve integrated into the bypass, the bypass upstream of the turbine can then be connected to the exhaust air path such that the bypass not only bypasses the second compressor but also the fuel cell stack.

The multi-stage air compression system proposed to solve the task mentioned above further comprises an electrically driven first compressor and a second compressor driven by a turbine. The compressors are arranged in a supply air path and the turbine is arranged in an exhaust air path of an air system for supplying air to a fuel cell stack. The second compressor can be bypassed via a bypass. According to the invention, the second compressor can be connected to the surrounding environment via at least one valve and/or a throttle valve on both the inlet and outlet sides.

The fact that the second compressor can be connected to the surrounding environment makes it possible to lower the pressure to the ambient pressure such that, when the air compression system is started, a pressure may be produced at the inlet of the turbine using the electrically driven first compressor which is higher than the pressure at the inlet of the second compressor, such that the second compression stage may be started only with the help of the first compression stage.

Accordingly, the proposed multi-stage air compression system is particularly suitable for carrying out the method according to the invention described above or can be operated according to this method. Thus, the same advantages can be achieved with the aid of the air compression system as with the aid of the method.

The connection of the second compressor to the surrounding environment is preferably achieved with two valves or a valve and a throttle valve. Where two valves are provided, a first valve is integrated in the supply air path upstream of the second compressor, and a second valve is integrated in the supply air path downstream of the second compressor. Where a valve and a throttle valve are provided, the throttle valve is preferably integrated upstream and the valve downstream of the second compressor in the supply air path. The valves may each be embodied as directional control valves, in particular as 4-way valves or as 3-way valves.

According to a preferred embodiment of the invention, the bypass can be connected to the supply air path via the at least one valve at the same time. In this case, no further or additional valve must be provided to connect the bypass to the supply air path. The system can therefore preferably be implemented in a very simple and cost-effective manner. In this case, the at least one valve is preferably embodied as 4-way valve. That is to say, there are four ways or connections, two connections to the supply air path, one to the bypass and one to the surrounding environment.

According to an alternative embodiment, the bypass is connected to the supply air path via at least one additional valve. This at least one additional valve is preferably embodied as 3-way valve and is integrated in the supply air path upstream of the at least one valve and/or the throttle valve for connecting the second compressor to the surrounding environment. In this way, the bypass can be opened and/or the second compressor can be connected to the surrounding environment completely independently of each other. While more valves are needed, they may be relatively simple in their design.

In order to reduce the number of valves, it is suggested as a further development that a throttle valve is integrated in the supply air path upstream of the second compressor, and that a valve preferably a 3-way valve, is integrated in the supply air path downstream of the second compressor. In this case, the throttle valve replaces one valve so that the connection of the second compressor to the surrounding environment can be completed with the aid of only one valve and one throttle valve.

Further, it is proposed that the bypass to bypass the second compressor and the fuel cell stack is connected to the exhaust air path via a further throttle valve. The supply air path and the exhaust air path can then be short-circuited via the bypass. In this case, the bypass is also connected via a valve and a throttle valve so that the number of valves can be further reduced.

Moreover, since the preferred scope of a multi-stage air compression system according to the present invention is a fuel cell system, a fuel cell system with a fuel cell stack and a multi-stage air compression system according to the present invention is proposed for supplying air to the fuel cell stack. The multi-stage air compression system helps to prevent startup problems during startup. Further, the wear in the area of the bearings may be reduced so as to improve reliability. Particularly preferably, the fuel cell system is therefore a mobile fuel cell system.

BRIEF DESCRIPTION OF THE DRAWINGS

Preferred embodiments of the invention are described in greater detail hereinafter with reference to the enclosed drawings. Shown are.

DETAILED DESCRIPTION

Figure 1:
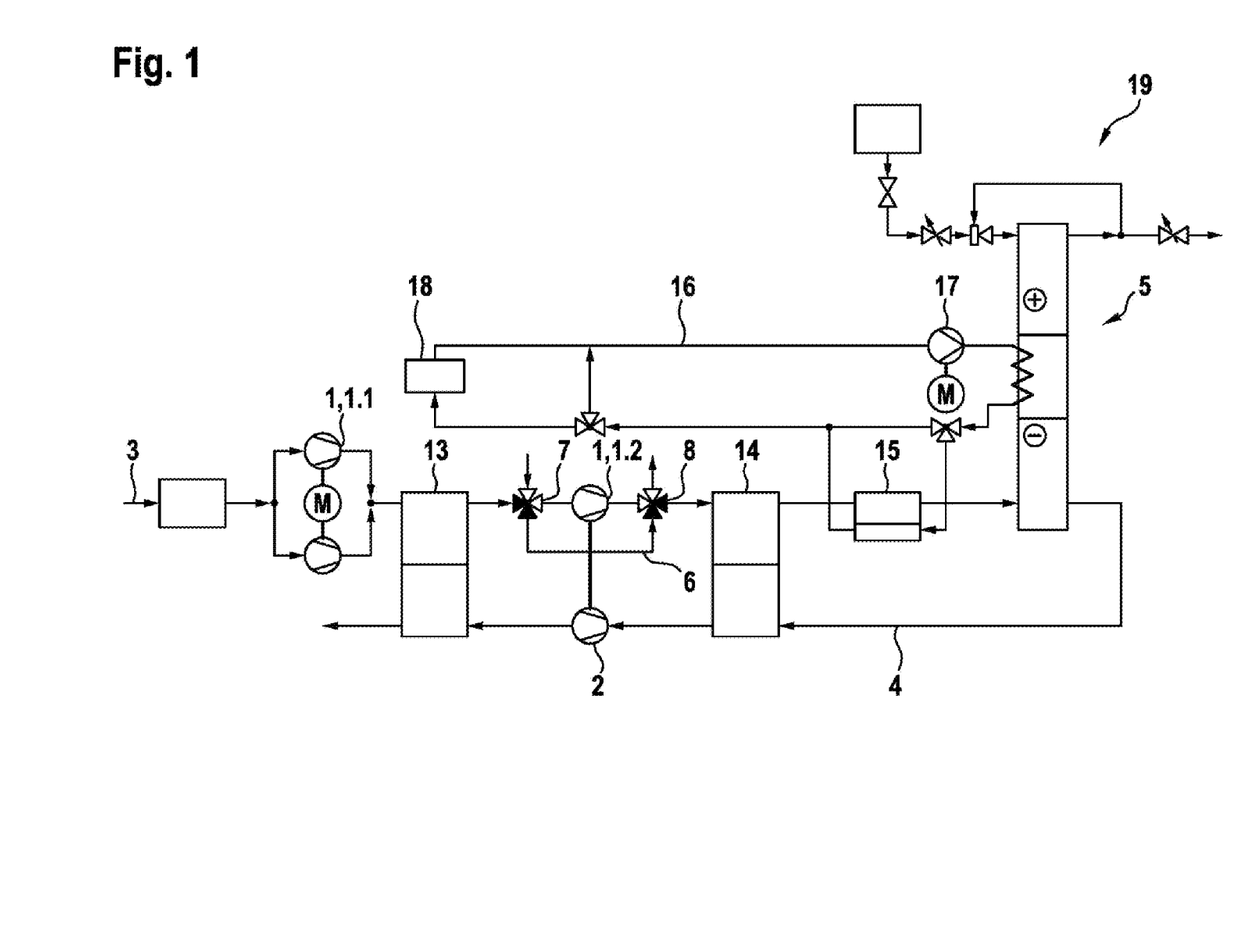
FIG. 1 a schematic illustration of a first fuel cell system according to the invention during startup, FIG. 2 a schematic illustration of the fuel cell system of FIG. 1 shortly after startup, FIG. 3 a schematic illustration of the fuel cell system of FIG. 1 in normal operation, FIG. 4 a schematic illustration of the fuel cell system of FIG. 1 in a first pump protection mode, FIG. 5 a schematic representation of the fuel cell system of FIG. 1 in a second pump protection mode, FIG. 6 a schematic illustration of the fuel cell system of FIG. 1 while stopping, FIG. 7 a schematic illustration of a second fuel cell system according to the invention, FIG. 8 a schematic illustration of a third fuel cell system according to the invention during startup, FIG. 9 a schematic illustration of the fuel cell system of FIG. 8 shortly after startup, FIG. 10 a schematic illustration of the fuel cell system of FIG. 8 in normal operation, FIG. 11 a schematic illustration of the fuel cell system of FIG. 8 in a first pump protection mode, FIG. 12 a schematic illustration of the fuel cell system of FIG. 8 in a second pump protection mode, FIG. 13 a schematic illustration of the fuel cell system of FIG. 8 while stopping.

The fuel cell system shown in FIG. 1 comprises a fuel cell stack 5 connected to an air system having a supply air path 3 and an exhaust air path 4 for supplying air. A multi-stage air compression system 1 is integrated into the air system, comprising an electrically driven first compressor 1.1 as well as a second compressor 1.2 driven by a turbine 2. The compressors 1.1, 1.2 are integrated in the supply air path 3, the turbine 2 into the exhaust air path 4 so that the exhaust air exiting the fuel cell stack 5 is supplied to the turbine 2. With the help of the turbine 2, a portion of the energy previously used to compress the air can thus be recovered. As air heats up when it is compressed, an intercooler 13 is arranged behind the first compressor 1.1 and a radiator 14 and a heat exchanger 15 are arranged behind second compressor 1.2. The heat exchanger 15 is connected to a cooling circuit 16 in which a coolant pump 17 and a vehicle radiator 18 are integrated. The fuel cell stack 5 is simultaneously cooled via the cooling circuit 16.

Since the electrochemical reaction in the fuel cells of the fuel cell stack 5 also requires hydrogen in addition to air, an anode circuit 19 is connected to the fuel cell stack 5 through which hydrogen is supplied.

At startup of the fuel cell system, the multi-stage air compression system 1 is simultaneously started. To do so, the electrically driven first compressor 1.1 is activated first. The air compressed with the aid of the first compressor 1.1 is supplied to the second compressor 1.2 via the supply air path 3. During startup, however, the compressed air is redirected via a valve 7, which in the present case is embodied as a 4-way valve and is integrated in the supply air path 3 upstream of the second compressor 1.2, diverted into a bypass 6 and directed back into the supply air path 3 downstream of the second compressor 1.2 via another valve 8, which is also embodied as a 4-way valve. The second compressor 1.2 is thus bypassed. At the same time, the valves 7, 8 are switched such that the second compressor 1.2 is connected to the surrounding environment so that the pressure at the second compressor 1.2 drops to the ambient pressure. As a result, with the help of the compressed air, it is possible to set a pressure at the inlet of the turbine 2 which is greater than the pressure at the inlet of the second compressor 1.2, so that the turbine 2 can easily start up.

Figure 2:
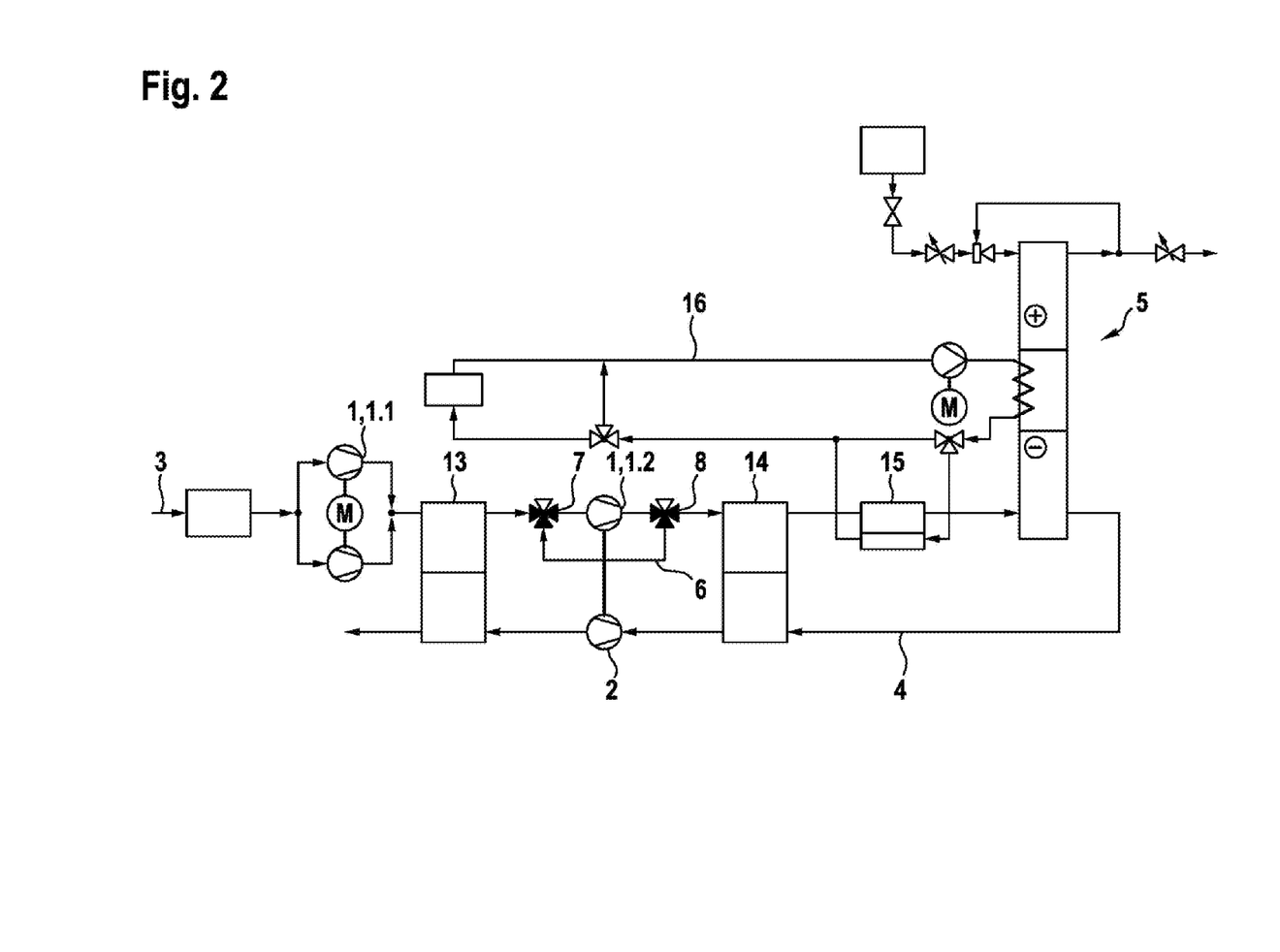

As shown by way of example in FIG. 2, shortly after startup, the connection of the second compressor 1.2 to the surrounding environment is closed once again by switching the valves 7, 8 accordingly, while the bypass 6 is kept open for a short time longer. Pressure builds up at the second compressor 1.2, which results in air flowing backward through the bypass 6. This is accompanied by a dampening effect during startup, preventing over-revving.

Figure 3:
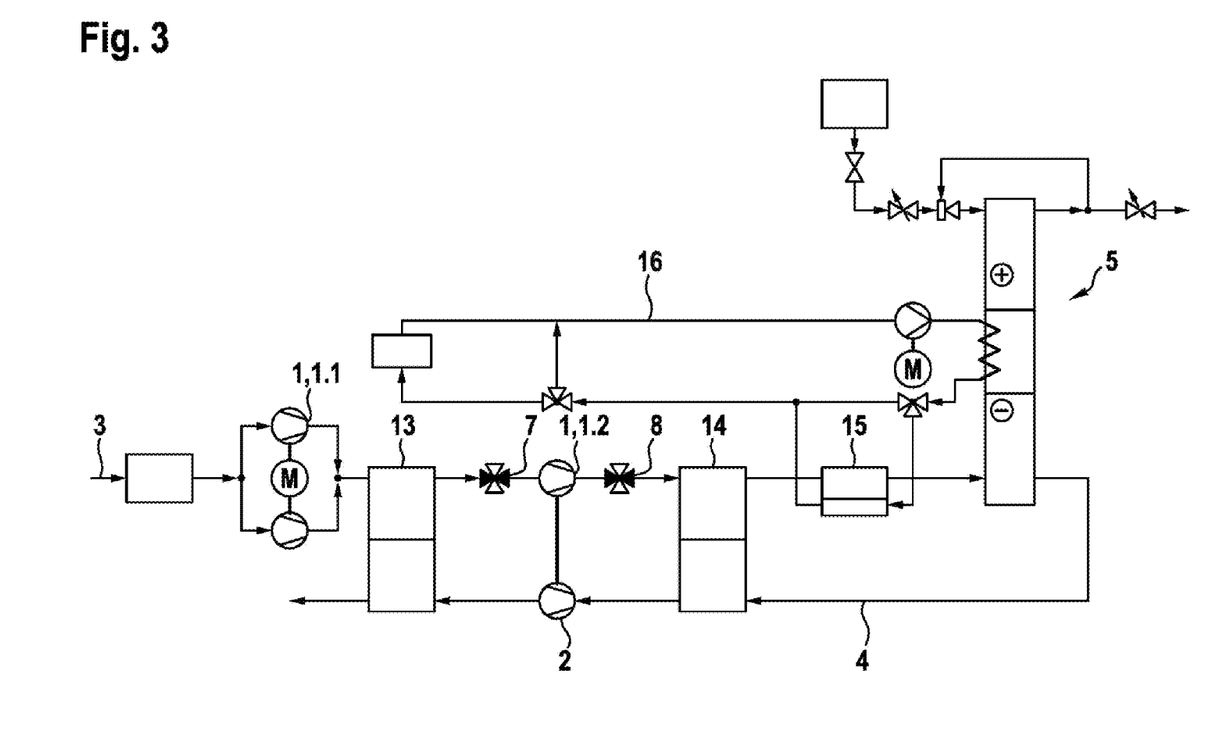

If the valves 7, 8 are subsequently switched so that the bypass 6 is also closed, the startup phase can be transitioned to normal operation. This switch position of the valves 7, 8 is shown by way of example in FIG. 3. To illustrate the closed bypass 6, the connection of the valves 7, 8 illustrating the bypass 6 is not shown.

Figure 4:
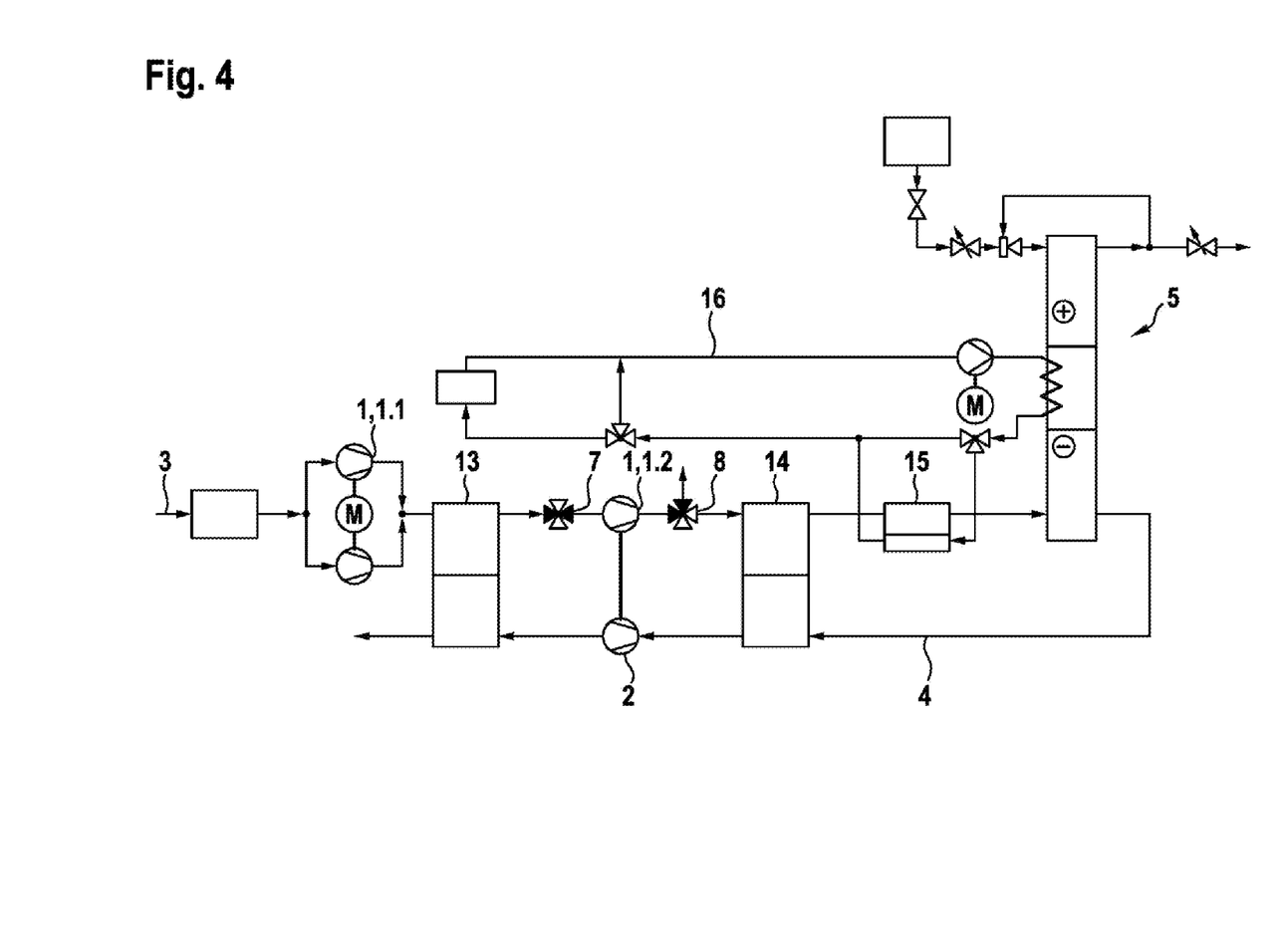

A variation of normal operation is shown in FIG. 4. The bypass 6 (not shown) remains closed but a connection to the surrounding environment is completed by opening the corresponding connection of the valve 8 arranged downstream of the second compressor 1.2. In this way, undesirable pumping of the compressor 1.2 can be counteracted. Opening the connection of the valve 8 thus provides pump protection.

Figure 5:
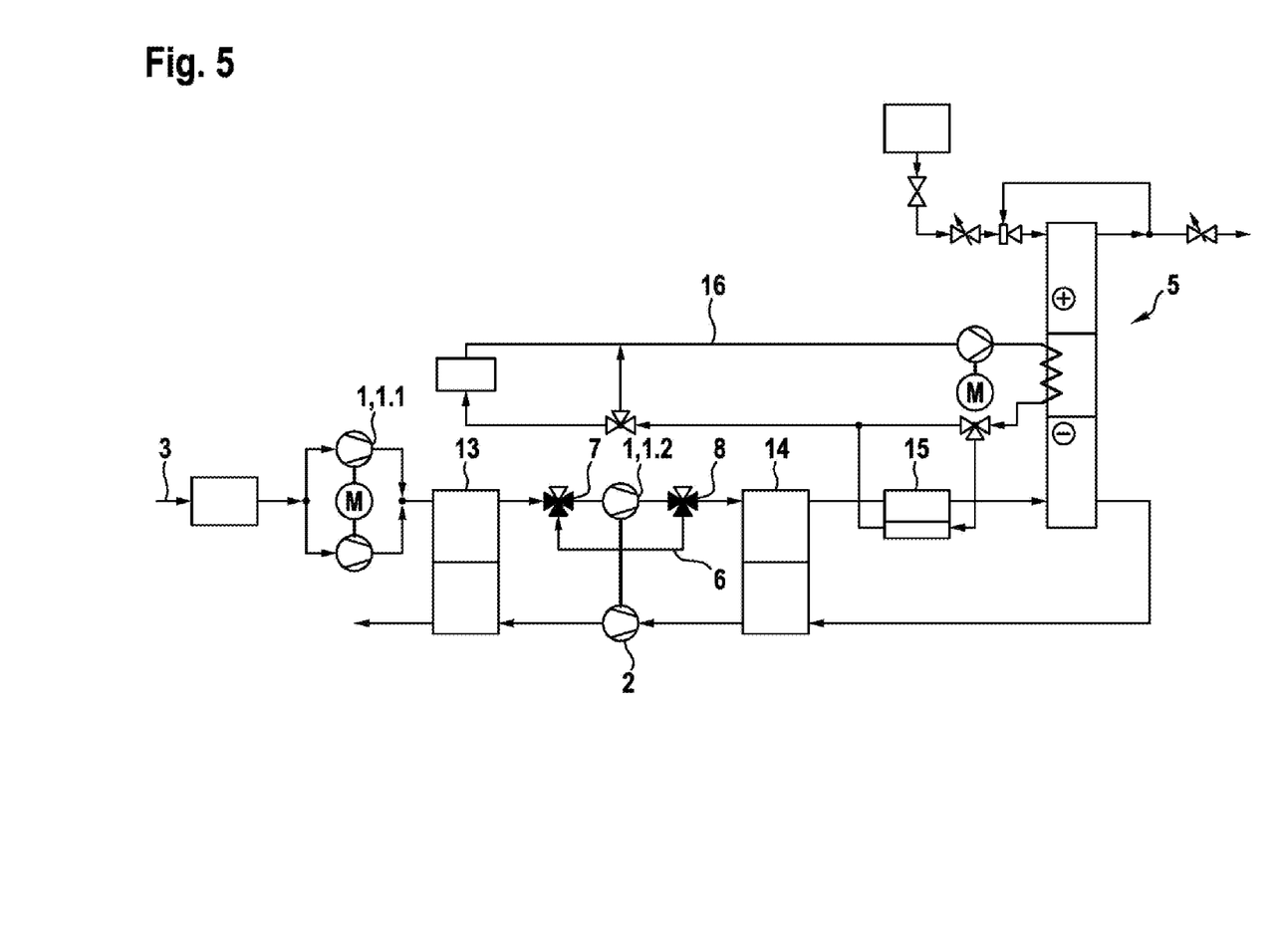

A further pump protection function can be realized by temporarily opening the bypass 6 once again, as shown by way of example in FIG. 5. This makes it possible to counteract not only undesirable pumping, but also over-revving at the same time.

Figure 6:
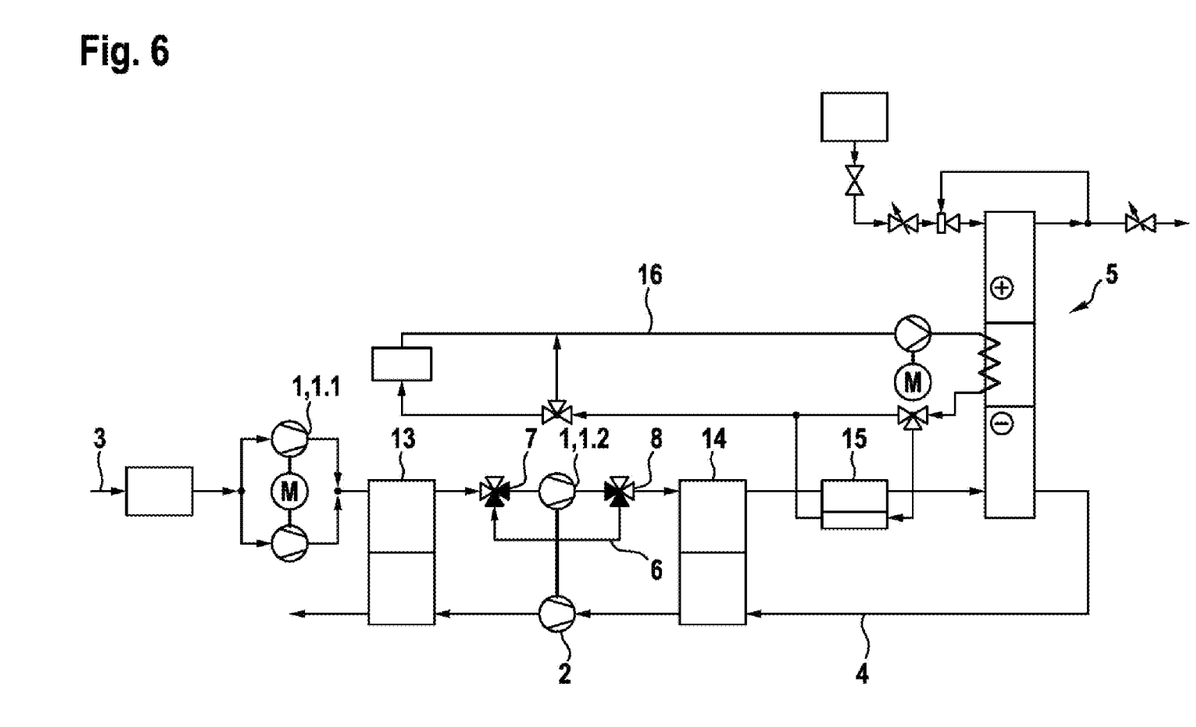

When shutting down the air compression system 1, the valves 7, 8 can be switched in such a way that only the bypass 6 is open, as shown by way of example in FIG. 6, to protect the gas bearings from increased wear. In this way, a braking action is achieved, which leads to a shortening of the shutdown phase and thus to protection of the gas bearings.

Figure 7:
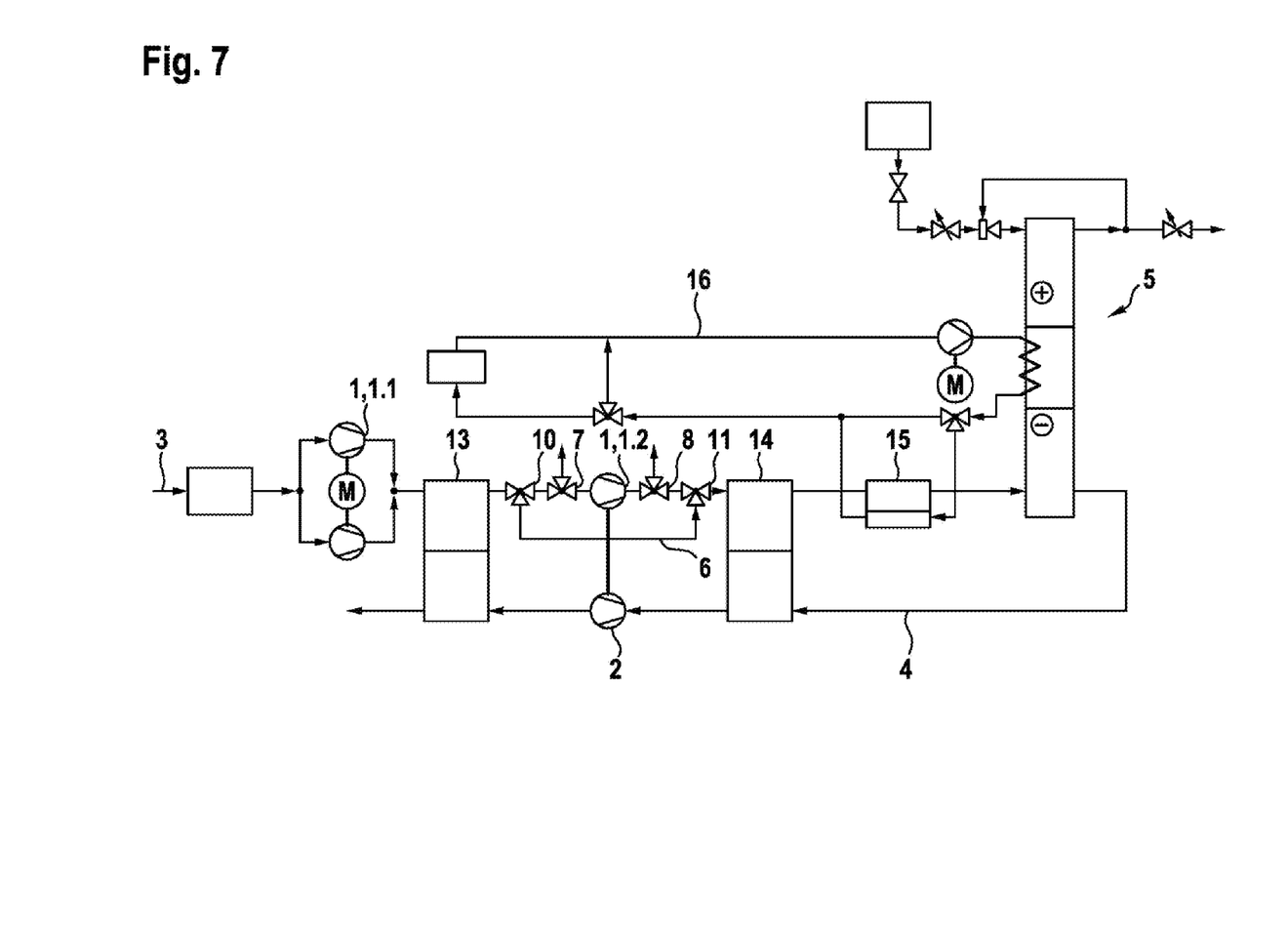

FIG. 7 shows a further fuel cell system according to the invention, which differs from that in FIG. 1 only by the valves 7, 8, 9, 10. Because four 3-way valves are provided instead of two 4-way valves. That is to say, in the present case, the valves 7, 8 are embodied as 3-way valves. In addition, there are two further 3-way valves, namely valves 9, 10, via which the bypass 6 is connected to the supply air path 3. The same functions previously described in connection with the fuel cell system of FIG. 1 can also be realized with the fuel cell system of FIG. 7 so that reference is made to the foregoing description.

Figure 8:
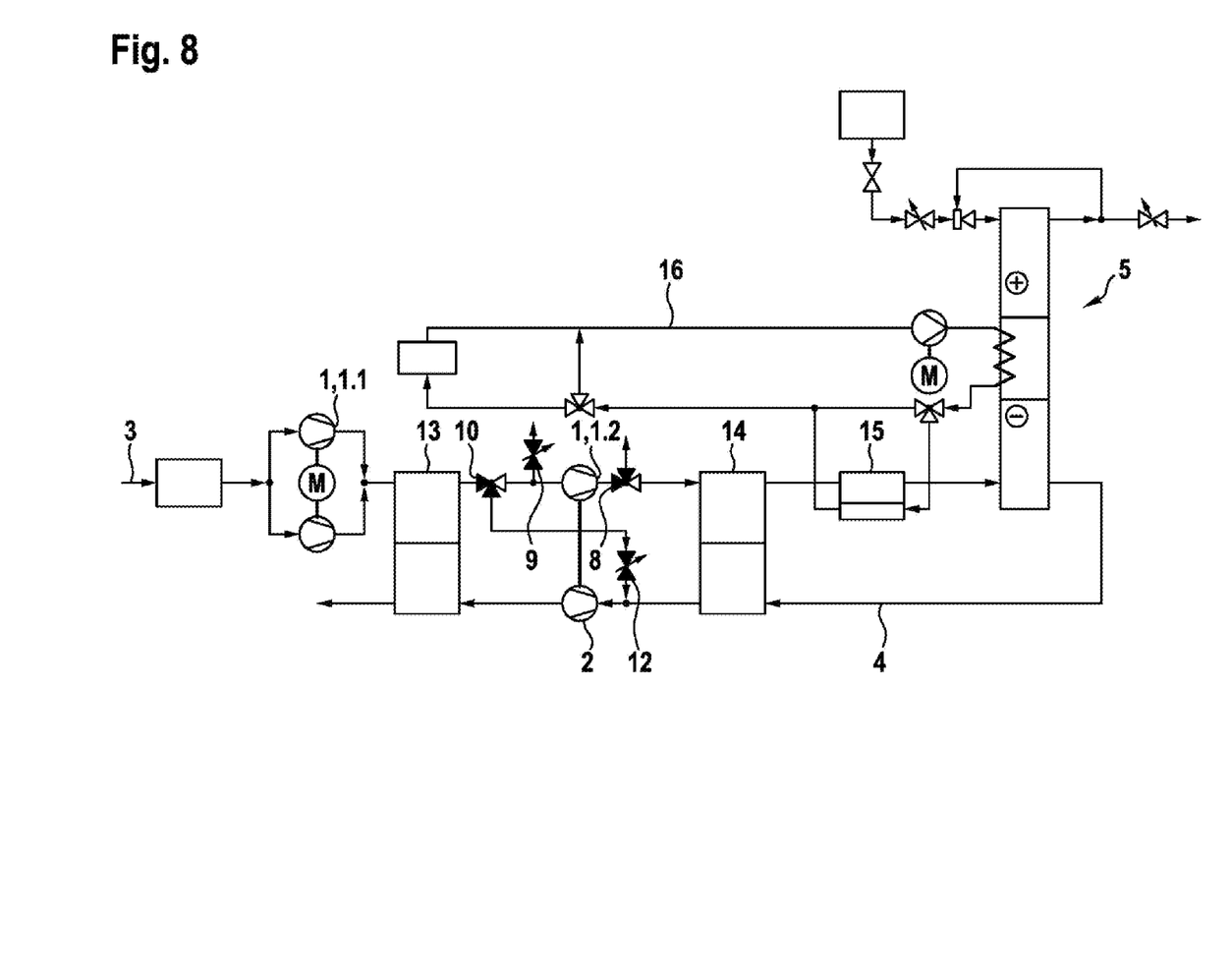

FIG. 8 shows a further fuel cell system according to the invention, which also allows all functions described above, but is interconnected differently. Instead of the two 4-way valves or the four 3-way valves, two valves 8, 10 embodied as 3-way valves, and two throttle valves 9, 12 are provided. The second compressor 1.2 is connected to the surrounding environment via a first throttle valve 9, which is integrated in the supply air path 3 upstream of the compressor 1.2, as well as via a first valve 8, which is integrated in the supply air path 3 downstream of the second compressor 1.2. The bypass 6 is connected to the supply air path 3 via the additional valve 10 and to the exhaust air path 4 via the additional throttle valve 12. Accordingly, the bypass 6 not only bypasses the second compressor 1.2 but also the fuel cell stack 5.

At startup, the valve 10 is switched so that air compressed with the help of the first compressor 1.1 is diverted from the supply air path 3 into the bypass 6 and is diverted into the exhaust air path 4 via the throttle valve 12 upstream of the turbine 2. As a result, the pressure at the inlet of the turbine 2 increases as the pressure at the second compressor 1.2 decreases, because the second compressor 1.2 is connected to the surrounding environment via the throttle valve 9 and the valve 8 at the same time. The turbine 2 can thus start up without any problems.

Shortly after startup, the valve 8 can be switched such that the connection to the surrounding environment is closed, while the bypass 6 is initially still kept open via the valve 10. This leads to a pressure build-up at the second compressor 1.2 and the air flows through the bypass 6 in the reverse direction. In this way, excessively fast startup and therefore over-revving are counteracted (see FIG. 9).

Figure 10:
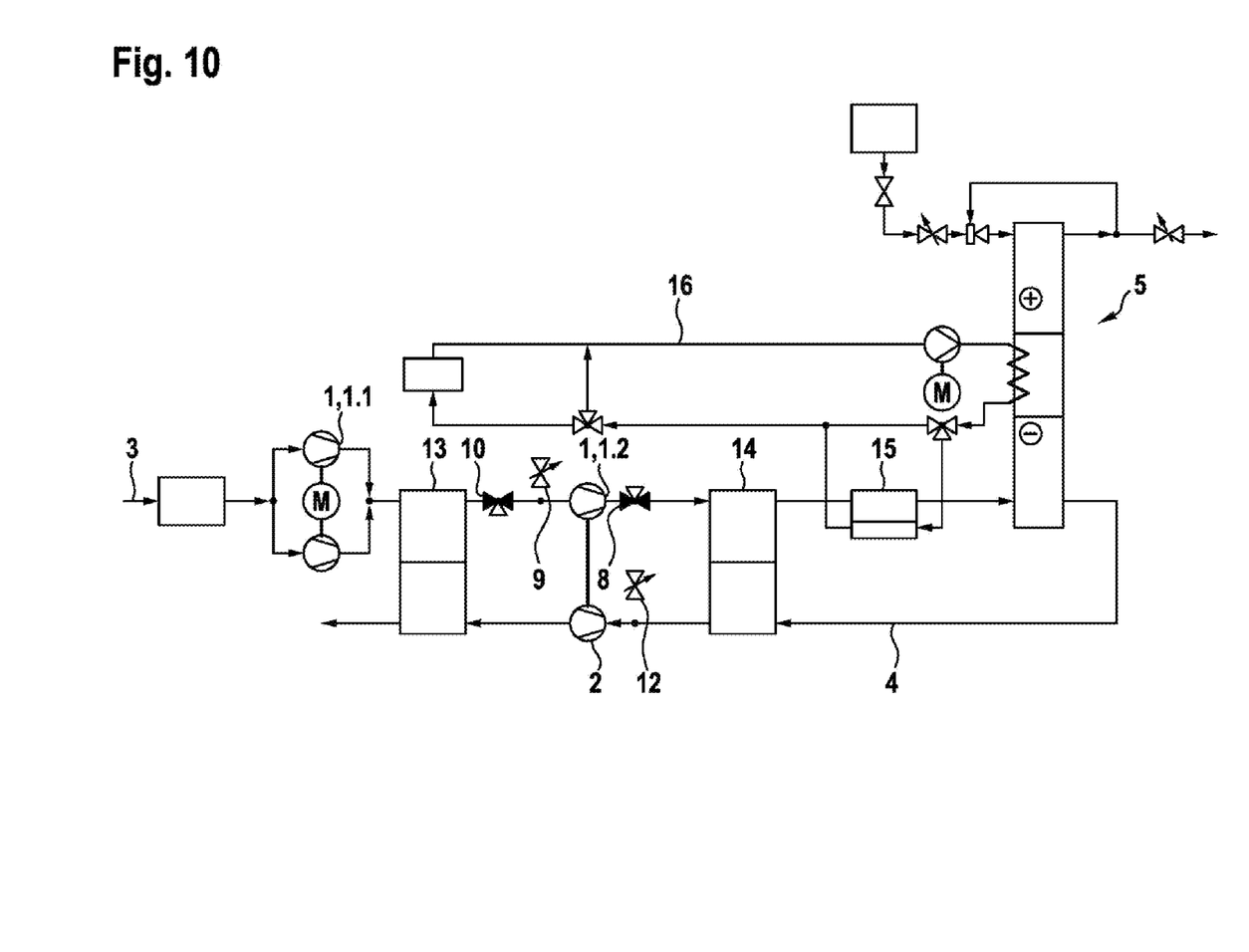

To transition to normal operation, the bypass 6 can be closed by switching the valve 10 so that the air compressed with the aid of the first compressor 1.1 is supplied entirely to the second compressor 1.2 and thus to the fuel cell stack 5 (see FIG. 10). To make it clear that the bypass 6 is closed, the bypass 6 was not illustrated in FIG. 10.

Figure 11:
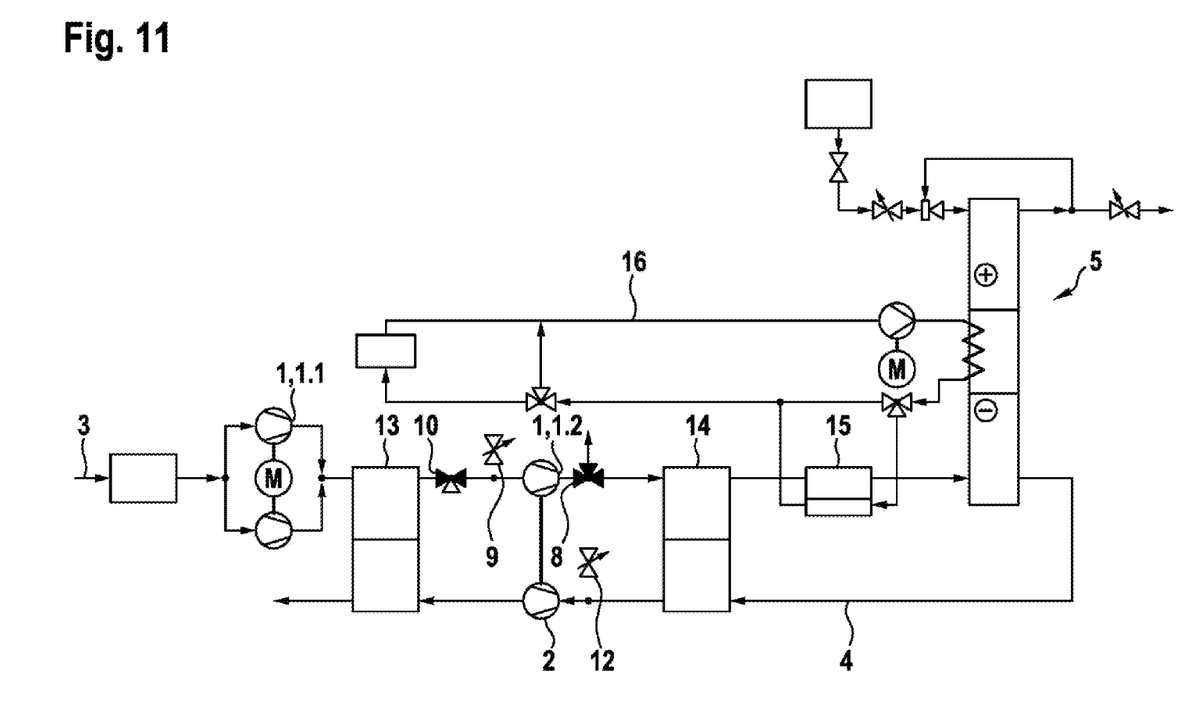

In order to implement a pump protection function, as shown by way of example in FIG. 11, the valve 8 can be switched in normal operation in such a way that the connection to the surrounding environment is opened. The bypass 6 is still closed (and therefore not shown).

Figure 9:
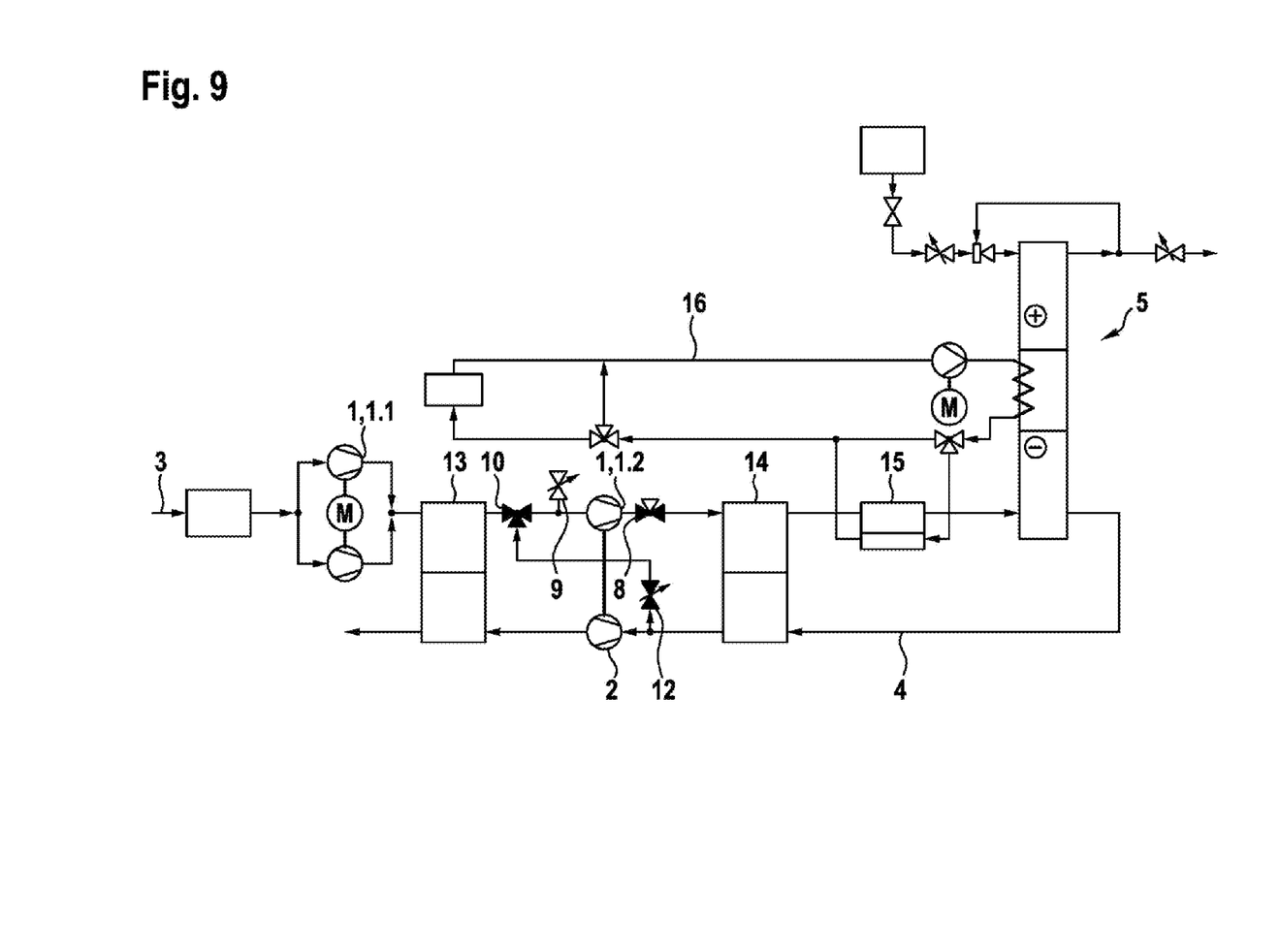
Figure 12:
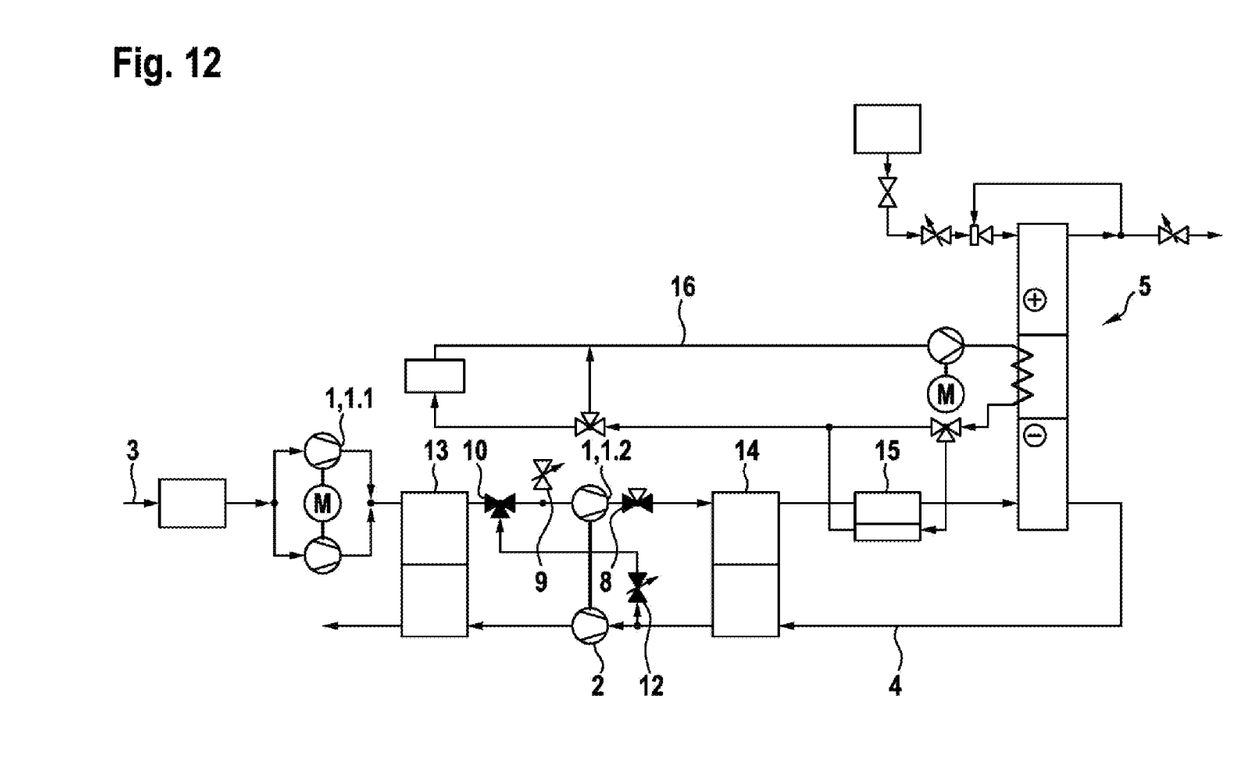

Alternatively, as shown by way of example in FIG. 12, the bypass 6 can be opened by switching the valve 10 accordingly, so that air flows through it in the reverse direction in the same manner as in FIG. 9. In this way, protection against over-revving can be achieved in addition to the pump protection function.

Figure 13:
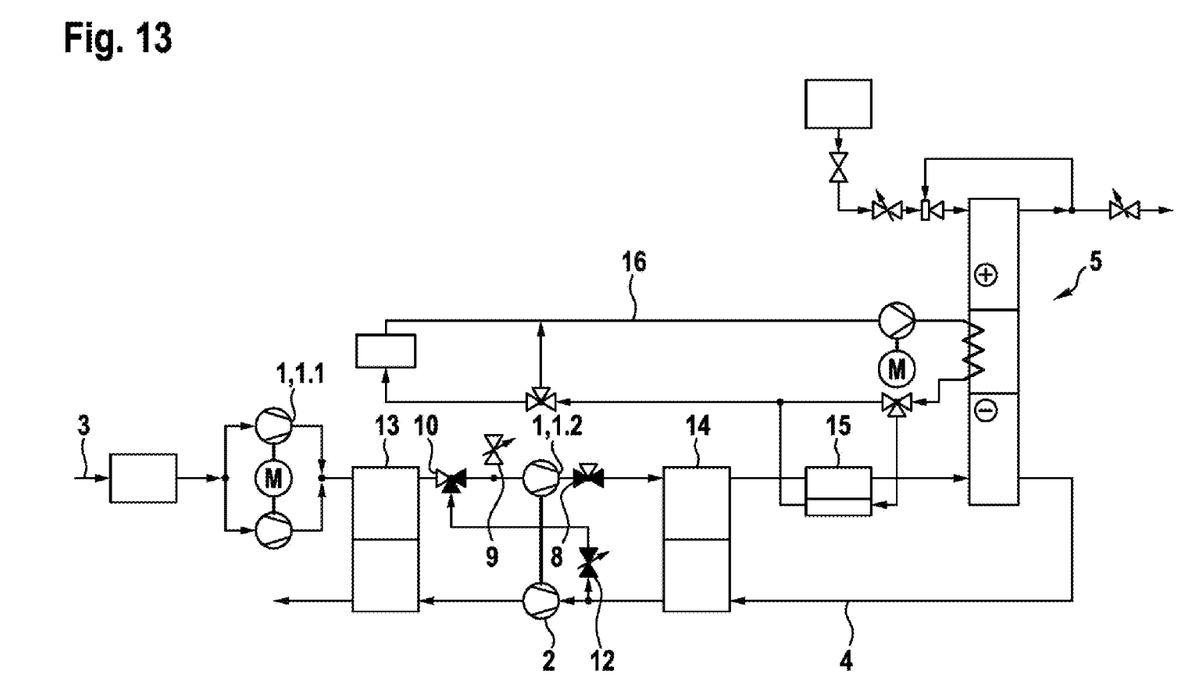

Further, when the system is stopped, an additional braking action can be achieved by disconnecting the second compressor 1.2 from the first compressor 1.1 by switching the valve 10 correspondingly (see FIG. 13) with the bypass 6 open.

The invention claimed is:

1. A method of operating a multi-stage air compression system (1) comprising an electrically driven first compressor (1.1) and a second compressor (1.2) driven by a turbine (2), wherein the compressors (1.1, 1.2) are arranged in a supply air path (3) and the turbine (2) is arranged in an exhaust air path (4) of an air system for supplying air to a fuel cell stack (5),
    wherein, when the air compression system (1) is started, air compressed by the first compressor (1.1) is supplied to the fuel cell stack (5) via a bypass (6) to bypass the second compressor (1.2) and the second compressor (1.2) is connected to surrounding environment on both inlet and outlet sides via at least one valve (7, 8) and/or a throttle valve (9).

2. The method according to claim 1,
    wherein after the air compression system (1) is started, the connection of the second compressor (1.2) to the surrounding environment is closed by the at least one valve (7, 8), while the bypass (6) is kept open.

3. The method according to claim 2,
    wherein after the connection of the second compressor (1.2) to the surrounding environment is closed, the bypass (6) is closed such that the air compressed by the first compressor (1.1) is supplied via the second compressor (1.2) to the fuel cell stack (5).

4. The method according to claim 1,
    wherein in normal operation of the air compression system (1), the second compressor (1.2) is at least temporarily connected to the surrounding environment via the at least one valve (7, 8) and/or the throttle valve (9) to implement a pump protection function.

5. The method according to claim 1,
    wherein in normal operation of the air compression system (1), the bypass (6) for bypassing the second compressor (1.2) is opened to implement a pump protection function.

6. The method according to claim 1,
    wherein, when the air compression system (1) is stopped, the bypass (6) to bypass the second compressor (1.2) is opened.

7. The method according to claim 1,
    wherein to open the bypass (6), the at least one valve (7, 8) or at least one additional valve (10, 11) is actuated, via which the bypass (6) is connected to the supply air path (3).

8. A multi-stage air compression system (1) comprising an electrically driven first compressor (1.1) and a second compressor (1.2) driven by a turbine (2), wherein the compressors (1.1, 1.2) are arranged in a supply air path (3) and the turbine (2) is arranged in an exhaust air path (4) of an air system for supplying air to a fuel cell stack (5), and wherein the second compressor (1.2) can be bypassed via a bypass (6),
    wherein the second compressor (1.2) can be connected to surrounding environment via at least one valve (7, 8) and/or a throttle valve (9) on both inlet and outlet sides of the second compressor (1.2).

9. The air compression system (1) according to claim 8, wherein the bypass (6) can also be connected to the supply air path (3) at a same time via the at least one valve (7, 8).

10. The air compression system (1) according to claim 8, wherein the bypass (6) is connected to the supply air path (3) via at least one additional valve (10, 11) and is integrated in the supply air path (3) upstream of the at least one valve (7, 8) and/or the throttle valve (9) for connecting the second compressor (1.2) to the surrounding environment.

11. The air compression system (1) according to claim 8, wherein the throttle valve (9) is integrated upstream of the second compressor (1.2) and a valve (7) of the at least one valve (7, 8) is integrated downstream of the second compressor (1.2) in the supply air path (3).

12. The air compression system (1) according to claim 11, wherein the bypass (6) for bypassing the second compressor (1.2) and the fuel cell stack (5) is connected to the exhaust air path (4) via an additional throttle valve (12).

13. A fuel cell system having a fuel cell stack (5) and a multi-stage air compression system (1) according to claim 8 for supplying air to the fuel cell stack (5).

14. The air compression system (1) according to claim 8, wherein the at least one valve (7, 8) is a 4-way valve.

15. The air compression system (1) according to claim 10, wherein the at least one additional valve (10, 11) is a 3-way valve.

16. The air compression system (1) according to claim 11, where the valve (7) of the at least one valve (7, 8) that is integrated downstream of the second compressor (1.2) in the supply air path (3) is a 3-way valve.

17. The air compression system (1) according to claim 10, wherein the throttle valve (9) is integrated upstream of the second compressor (1.2) and a valve (7) of the at least one valve (7, 8) is integrated downstream of the second compressor (1.2) in the supply air path (3).

18. The air compression system (1) according to claim 17, where the valve (7) of the at least one valve (7, 8) that is integrated downstream of the second compressor (1.2) in the supply air path (3) is a 3-way valve.

19. The air compression system (1) according to claim 17, wherein the bypass (6) for bypassing the second compressor (1.2) and the fuel cell stack (5) is connected to the exhaust air path (4) via an additional throttle valve (12).

* * * * *